2,871,137

METHOD FOR PREPARING EMULSIFYING AGENTS AND EMULSIONS PREPARED THEREFROM

Clyde Lee Aldridge, Baker, and Elphege Maxime Charlet, Baton Rouge, La., assignors to Esso Research and Engineering Company, a corporation of Delaware No Drawing. Application June 13, 1955
Serial No. 515,233

20 Claims. (Cl. 106—285)

This invention relates to a method for preparing emulsions of hydrocarbon polymers and more particularly relates to the preparation of an emulsifying agent from the hydrocarbon polymer to be emulsified and subsequently using this agent for the emulsification.

It is known to prepare emulsions of hydrocarbon polymers by dissolving the polymer in a suitable solvent, emulsifying the solution with water in the presence of a suitable emulsifier and stripping off the solvent. However, it is very difficult to prepare an emulsion which is stable after the stripping step. This is a very vigorous step and emulsions otherwise stable often break when an attempt is made to strip off the solvent.

It is therefore the main object of this invention to provide a method for the emulsification of high molecular weight hydrocarbon polymers which will either avoid the solvent stripping step or produce such a stable emulsion that the difficulties usually inherent are no longer present.

It is a further object of this invention to provide a novel emulsifying agent that will produce an emulsion of hydrocarbon polymers with water which will possess unusual mechanical and chemical stability.

It is a still further object of this invention to prepare emulsifying agents and surfactants from the hydrocarbon polymer to be emulsified.

It is another object of the invention to prepare emulsions from hydrocarbon polymers by treating the hydrocarbon to convert a portion thereof to an emulsion which acts to emulsify the remaining polymer.

According to one embodiment of the invention these objects are accomplished by reacting any hydrocarbon polymer having at least a small amount of unsaturation with an anhydride selected from the group consisting of maleic anhydride, chloromaleic anhydride and citraconic anhydride and neutralizing the resulting adduct with a basic compound of an alkali metal. The salt thus obtained possesses surfactant characteristics and is particularly effective as an emulsifying agent for the polymer from which it was made or for any other hydrocarbon polymer whether saturated or unsaturated.

The unsaturated polymers to which the invention is applicable include the copolymer of 97% isobutylene and 3% isoprene prepared by low temperature Friedel-Crafts polymerization and known as Butyl rubber; the copolymer of 10–90% isobutylene and 90–100% styrene also prepared by low temperature Friedel-Craft polymerization; resins prepared by the low temperature Friedel-Crafts polymerization of steam-cracked petroleum fractions; liquid and solid polymers of butadiene and copolymers of butadiene and styrene prepared by sodium polymerization at temperatures between 30 and 100° C.; and polymers obtained by the emulsion copolymerization of butadiene and styrene or acrylonitrile and known as GRS and GRN, respectively.

In accordance with the present invention any one of the above polymers is reacted with 0.01 to 5% maleic or other anhydride at a temperature between 50 and 250° C. The necessary reaction time will vary between 15 minutes and 24 hours depending on the temperature employed. A catalyst such as tertiary butyl hydroperoxide or ditertiary butyl peroxide may be used, if desired. The preparation of these adducts from the liquid copolymers of 75 to 85%, preferably 80%, butadiene and 15 to 25%, preferably 20%, styrene is described in U. S. Patent 2,652,342, issued September 15, 1953, in the name of Anthony H. Gleason, while the preparation of the adduct from resins obtained by the low temperature Friedel-Crafts polymerization of steam-cracked petroleum feed stocks is described in copending application Ser. No. 448,357, filed August 6, 1954, in the names of John F. McKay and Joseph F. Nelson. Reference is hereby made to each of these for further details which are incorporated herein by reference. The anhydride adducts of the other polymers are prepared in a similar manner.

In accordance with the present invention these anhydride adducts are converted to salts by reacting them with a basic compound of an alkali metal or ammonium such as the hydroxides or carbonates of sodium, potassium, lithium, rubidium, calcium or ammonium or with organic bases such as amines or tetrasubstituted ammonium hydroxides. This is accomplished simply by dissolving the polymer-anhydride adduct in a suitable solvent and mixing it with an aqueous solution of the basic compound. The salt forms as a jelly-like material which separates from the water. In this form it is a potent emulsifier for the polymer from which it was formed or for any other of the hydrocarbon polymers named above as well as for saturated type polymers, such as polyisobutylene.

It is not necessary, however, to isolate the alkali metal or nitrogen base salt of the polymer. It is only necessary to add a small amount (0.1 to 5%) of the anhydride adduct to a solution of a polymer and then emulsify by adding water containing enough alkali to neutralize the anhydride groups and agitating. Similarly a large amount of an unsaturated polymer may be emulsified by reacting it with a small amount (.01 to .5%) of the anhydride followed by agitation with an aqueous solution of an alkali such as the hydroxide or carbonate of the alkali metals and ammonium or tetra-substituted ammonium hydroxides or organic bases. The emulsions formed by organic bases and ammonium compounds differ from those formed from alkali metal bases in that they can be broken at will simply by heating to drive off the ammonia.

In forming the emulsion it is preferred to use distilled water or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the emulsion is not critical as long as there is enough present to produce a stable water-reducible emulsion. Suitable amounts may vary from one part of water for every ten parts of rubber solution to 10 parts of water for every part of rubber solution.

The advantages of the invention will be better understood from a consideration of the following experimental data which are given for the sake of illustration, but without intention of limiting the invention thereto.

Example I 100 cc. of a 50% solution of an oil (prepared by copolymerizing 80% butadiene and 20% styrene in accordance with the disclosures of copending application Serial No. 176,771, filed July 29, 1950, in the name of Anthony H. Gleason, now U. S. Patent 2,762,851) are reacted with 1% maleic anhydride in accordance with the disclosures of U. S. Patent 2,652,342 issued September 15, 1953, in the name of Anthony H. Gleason and mixed in a mechanical agitator with 100 cc. of 1% sodium hydroxide solution. Approximately 150 cc. of a jelly-like layer separated from the water. One gram of this jelly was dissolved in 200 cc. of n-hexane and poured into 150 cc. of water while agitating. The mixing was continued for 3 minutes whereupon a stable emulsion with a viscosity about like that of water was formed. Further addition of up to 3 parts of water to 1 part of hydrocarbon caused the material to become increasingly viscous and finally a stable paste. The emulsion showed no signs of breaking after standing for a day.

*Example II*

One gram of the emulsifier jelly prepared in accordance with Example I was dispersed in 10 cc. of hexane. This was then dissolved in 200 cc. of 50% NVM polymer oil prepared by copolymerizing 80% butadiene and 20% styrene with sodium in accordance with the teachings of Serial No. 176,771. This solution was then added with agitation to 200 cc. water. The agitation was continued for three minutes whereupon a stable emulsion of low viscosity was formed. This emulsion showed no sign of breaking after a day. If desired the solvent may be removed from the latex by evaporation or stripping with no adverse effect upon the emulsion.

*Example III*

100 grams of a petroleum resin having a softening point of about 100° C. and made by Friedel-Crafts low temperature polymerization of steam-cracked petroleum streams were reacted with 5 grams of maleic anhydride at 200° C. for 3 hours. Ten cubic centimeters of a 10% solution of the resulting adduct in a hydrocarbon solvent was added to 200 cc. of a 50 wt. percent solution of the original petroleum resin. The mixture was poured slowly into 215 cc. of 0.35% caustic in a Waring Blendor and agitated for three minutes. At the end of this time a good emulsion formed which showed some evidence of creaming after standing overnight but which was readily dispersed by mild shaking.

*Example IV*

100 grams of the petroleum resin of Example III were reacted at 200° C. for three hours with 0.2 gram of maleic anhydride. 96.5 grams of this material were dissolved in 145 cc. of hexane to give a 50 wt. percent solution. Two hundred cubic centimeters of this solution were slowly added to 200 cc. of 1% sodium hydroxide solution in a Waring Blendor and agitation continued for 3 minutes. An excellent emulsion was formed which showed no signs of breaking after 1 day.

The latices obtained in accordance with this invention are suitable for use in the preparation of foam rubber sponge extenders, paper size, paper shades and drapes, tire cord coating compositions, emulsion paints, resilient concrete, laminant for paper, wood, canvas and plywood, binder for cork, wood, fiber, and leather buffings, industrial gloves and protective clothing, raincoating, rug backing and other dipped goods and in adhesives.

The nature of the present invention having been thus fully set forth and specific examples of the same given, what is claimed as new and useful and desired to be secured by Letters Patent is:

1. A process for preparing an emulsion of hydrocarbon polymer which comprises emulsifying a high molecular weight polymer with water in the presence of the addition product of an unsaturated polymer selected from the group consisting of isobutylene and isoprene copolymers, isobutylene and styrene copolymers, butadiene and styrene copolymers, butadiene and acrylonitrile copolymers, polybutadiene and steam-cracked petroleum resins, and an anhydride selected from the group consisting of maleic anhydride, chloromaleic anhydride and citraconic anhydride neutralized with a compound selected from the group consisting of alkali metal hydroxides, alkali metal carbonates, ammonium hydroxide, ammonium carbonate and organic bases.

2. A process for preparing an emulsion of an unsaturated hydrocarbon polymer which comprises reacting said unsaturated polymer selected from the group consisting of isobutylene and isoprene copolymers, isobutylene and styrene copolymers, butadiene and styrene copolymers, butadiene and acrylonitrile copolymers, polybutadiene and steam-cracked petroleum resins with .01 to 5.0% of an anhydride selected from the group consisting of maleic anhydride, chloromaleic anhydride and citraconic anhydride whereby anhydride groups are introduced into a small portion of said polymer, neutralizing the said anhydride groups with a compound selected from the group consisting of alkali metal hydroxides, alkali metal carbonates, ammonium hydroxide, ammonium carbonate and organic bases whereby the salt of the anhydride-polymer adduct is formed, adding water and emulsifying the said polymer in the presence of said salt as emulsifier.

3. A process for preparing an emulsion of an unsaturated hydrocarbon polymer which comprises reacting said unsaturated polymer selected from the group consisting of isobutylene and isoprene copolymers, isobutylene and styrene copolymers, butadiene and styrene copolymers, butadiene and acrylonitrile copolymers, polybutadiene and steam-cracked petroleum resins with 0.1 to 0.5% of an anhydride selected from the group consisting of maleic anhydride, chloromaleic anhydride and citraconic anhydride, adding an aqueous solution of a compound selected from the group consisting of alkali metal hydroxides, alkali metal carbonates, ammonium hydroxide, ammonium carbonate and organic bases, and agitating.

4. A process for preparing an emulsion of an unsaturated hydrocarbon polymer which comprises reacting said unsaturated polymer selected from the group consisting of isobutylene and isoprene copolymers, isobutylene and styrene copolymers, butadiene and styrene copolymers, butadiene and acrylonitrile copolymers, polybutadiene and steam-cracked petroleum resins with .01 to 5.0% of an anhydride selected from the group consisting of maleic anhydride, chloromaleic anhydride and citraconic anhydride whereby anhydride groups are introduced into a portion of said polymer, neutralizing the said anhydride groups with an alkali metal compound, whereby the salt of the anhydride-polymer adduct is formed, adding water and emulsifying said polymer in the presence of said salt.

5. An emulsifying agent comprising the neutralization product of a compound selected from the group consisting of alkali metal hydroxides, alkali metal carbonates, ammonium hydroxide, ammonium carbonate and organic bases, and the addition product of an unsaturated hydrocarbon polymer selected from the group consisting of isobutylene and isoprene copolymers, isobutylene and styrene copolymers, butadiene and styrene copolymers, butadiene and acrylonitrile copolymers, polybutadiene and steam-cracked petroleum resins, and 0.01 to 5% of an anhydride selected from the group consisting of maleic anhydride, chloromaleic anhydride and citraconic anhydride.

6. Process according to claim 1 in which the second polymer is a liquid copolymer of 80% butadiene, and 20% styrene, the anhydride is maleic anhydride and the compound is sodium hydroxide.

7. Process according to claim 6 in which the first polymer is a liquid copolymer of 80% butadiene and 20% styrene.

8. Process according to claim 1 in which the second polymer is a steam-cracked petroleum resin.

9. Process according to claim 8 in which the first polymer is a steam-cracked petroleum resin.

10. Process according to claim 3 in which the unsaturated polymer is a liquid copolymer of 80% butadiene and 20% styrene.

11. Process according to claim 3 in which the unsaturated polymer is a steam-cracked petroleum resin.

12. A process for preparing an emulsifying agent which comprises mixing 20 to 80% of an unsaturated hydrocarbon polymer with 80 to 20% of a solvent consisting of an inert hydrocarbon boiling between 150 and 250° C., adding 0.01 to 5 parts per 100 parts of polymer of an anhydride selected from the group consisting of maleic anhydride, chloromaleic anhydride and citraconic anhydride, heating the resulting mixture to 50 to 250° C. until an adduct forms and neutralizing the resulting adduct with a compound selected from the group consisting of alkali metal hydroxides, alkali metal carbonates, ammonium hydroxide, ammonium carbonate, and organic bases.

13. Process according to claim 12 in which the unsaturated polymer is a liquid sodium copolymer of 75 to 85 parts of butadiene-1,3 and 15 to 25 parts of styrene.

14. Process according to claim 13 in which the anhydride is maleic anhydride.

15. Process according to claim 14 in which the adduct is neutralized with sodium hydroxide.

16. Process according to claim 12 in which the unsaturated polymer is a steam-cracked petroleum resin.

17. Process according to claim 16 in which the anhydride is maleic anhydride.

18. Process according to claim 17 in which the adduct is neutralized with sodium hydroxide.

19. An emulsifying agent comprising the sodium salt of the addition product of a sodium copolymer of 75 to 85 parts of butadiene-1,3 and 25 to 15 parts of styrene with 0.1 to .5 part of maleic anhydride.

20. An emulsifying agent comprising the sodium salt of the addition product of a steam-cracked petroleum resin and maleic anhydride.

References Cited in the file of this patent

UNITED STATES PATENTS

| | | |
|---|---|---|
| 1,976,679 | Fikentscher et al. | Oct. 9, 1934 |
| 2,047,398 | Voss et al. | July 14, 1936 |
| 2,575,750 | Davison | Nov. 20, 1951 |
| 2,634,256 | Sparks | Apr. 7, 1953 |
| 2,652,342 | Gleason | Sept. 15, 1953 |
| 2,753,318 | Maeder | July 3, 1956 |